March 19, 1940.  T. K. BOOTH  2,194,273

FARE ANTITHEFT DEVICE FOR TAXICABS

Filed May 3, 1938

INVENTOR.
Thomas K. Booth
BY
Clark & Ott
ATTORNEYS

Patented Mar. 19, 1940

2,194,273

UNITED STATES PATENT OFFICE 2,194,273

FARE ANTITHEFT DEVICE FOR TAXICABS

Thomas K. Booth, Bronx, N. Y.

Application May 3, 1938, Serial No. 205,865

1 Claim. (Cl. 180—82)

This invention relates to devices for preventing theft of money received as taxicab fares by the driver and has particular reference to a device operated in conjunction with the fare recording meter to insure the movement thereof to recording position when a passenger enters the taxicab.

The invention has in view a device of the indicated character which permits the taxicab to "cruise" with the indicator flag of the fare recording meter thrown to non-recording position when the taxicab is unoccupied by a passenger and which necessitates the movement of the indicator flag of the fare recording meter to the recording position when a passenger enters the taxicab.

The invention further comprehends a device of said character which is so constructed and arranged as to render the motor inoperative when a passenger enters the taxicab and which necessitates the movement of the indicator flag of the fare recording meter to the recording position to render the motor operative.

The invention more particularly comprehends means actuated by the weight of a passenger on the seat of the taxicab to render the motor inoperative and means associated with the fare indicator meter for rendering the motor of the taxicab operative when the flag thereof is moved to recording position.

With the foregoing and other objects in view, reference is now made to the following specification and the accompanying drawing in which there is illustrated the preferred embodiment of the invention.

Figure 1:
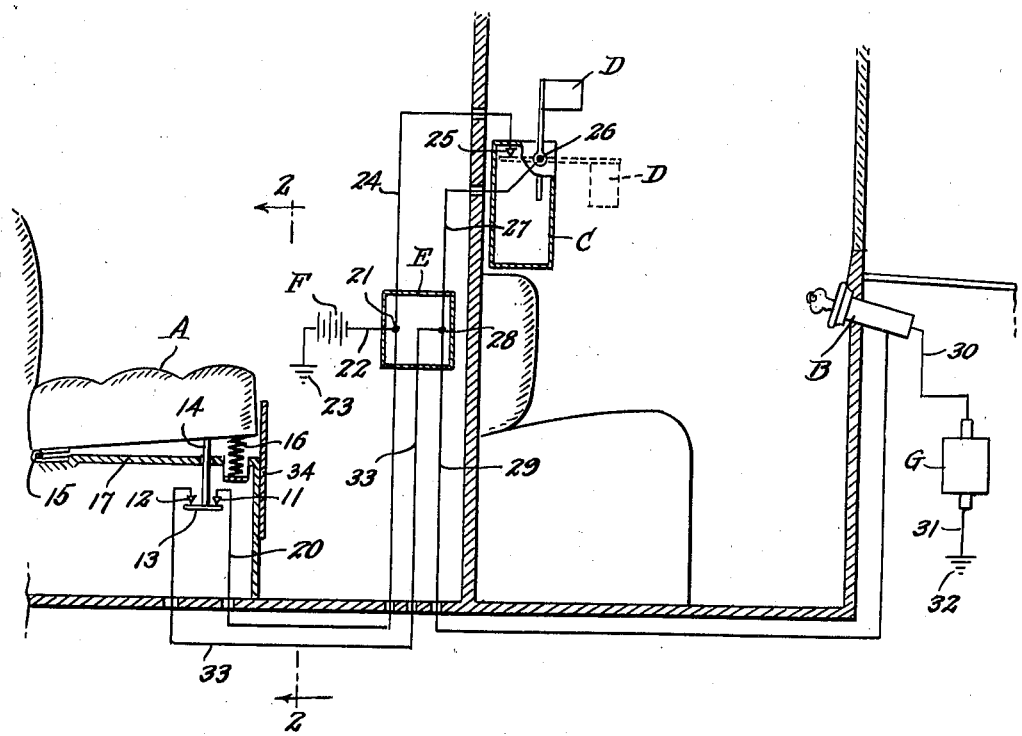
Fig. 1 is a diagrammatic view illustrating the fare anti-theft device installed in a taxicab.
Figure 2:
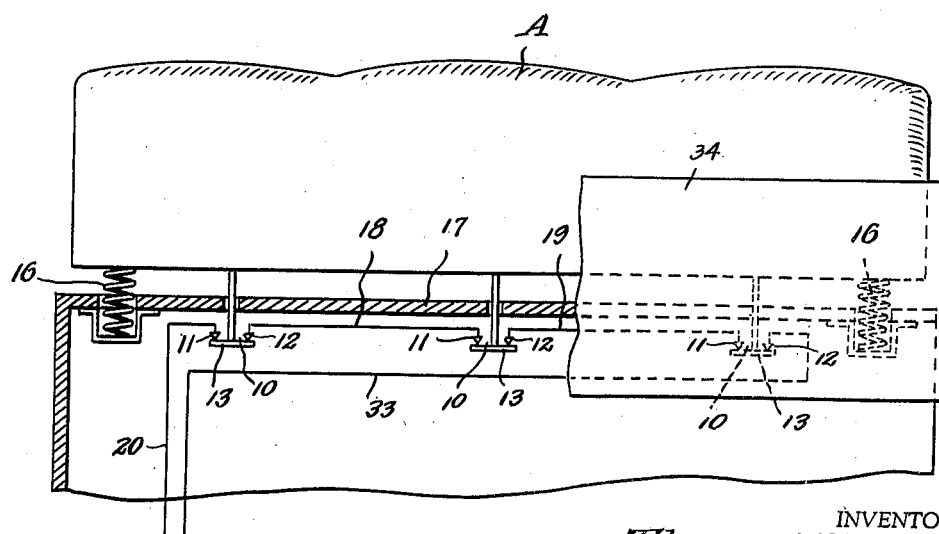
Fig. 2 is a diagrammatic sectional view on line 2—2 of Fig. 1 with parts broken away to disclose the underlying structure.

Referring to the drawing by characters of reference, A designates the passenger seat of a taxicab or motor vehicle for transporting passengers, B the usual key ignition switch thereof and C the fare recording meter provided with the usual indicator flag D which is movable from an upstanding position to a horizontal position to place the meter in operation to record the mileage and the fare.

The device for insuring that the meter C be placed in operation to record the mileage and fare when a passenger enters the taxicab includes one or more switches 10, three such switches being shown in the present embodiment, which are disposed in transversely spaced relation beneath the passenger seat A of the taxicab and which switches each includes a pair of fixed contacts 11 and 12 and a movable contact plate 13 affixed to the lower end of a depending rod 14 secured at its upper end to the underside of the passenger seat A.

The passenger seat A is pivoted at the rear as at 15 and the forward portion thereof is normally maintained by coiled expansion springs 16 in an elevated position out of supporting contact with the seat supporting structure 17 so that when the seat is unoccupied, the movable contact plate 13 is disposed in bridging contact with the fixed contact points 11 and 12 of each switch 10.

The switches 10 are connected in series by conductor wires 18 and 19 joining the fixed contacts 11 and 12 of adjacent switches. The contact 11 of one of the end switches 10 has connected thereto a conductor wire 20 which is connected at its opposite end to a fixed terminal 21 located within the taxicab terminal box E and which terminal 21 is connected by a conductor wire 22 to the positive side of the taxicab storage battery F having its negative terminal grounded to the chassis as at 23. A conductor wire 24, leading from the fixed terminal 21, is connected to a fixed contact 25 of the indicator flag switch 26 located within the fare recording meter C. The movable contact of the indicator flag switch 26 has connected thereto a conductor wire 27 which is connected at its opposite end to a juncture terminal 28 located within the terminal box E.

A conductor wire 29 connects the juncture terminal 28 with one terminal of the key ignition switch B. The opposite terminal of the key ignition switch B is connected by a conductor wire 30 to the induction coil G of the ignition system which is grounded to the chassis of the taxicab by a conductor wire 31 as at 32.

The juncture terminal 28 also has connected thereto a conductor wire 33 which leads to and is connected to the fixed contact 12 of the opposite endmost switch 10.

By this construction the ignition system of the taxicab may be placed in operation by the turning of the ignition key of the switch B and the operator of the taxicab may "cruise" in search of passengers with the indicator flag D in the upstanding position in which position the switch 26 is open and the fare recording meter C in inactive non-recording position. When in this position the switches 10 are closed and are in series in the ignition circuit leading from the positive terminal of the battery F to the fixed terminal 21, conductor wire 20, switches 10, conductor wire 33, juncture terminal 28, conductor wire 29, key ignition switch B, conductor wire 30 to the ignition coil G and through conductor wire 31 to ground 32 and from the ground 23 to the negative side of the battery F.

When the taxicab is occupied by a passenger the seat A is depressed by the weight of the passenger to move one or more of the contact plates 13 of the switches 10 out of contact with the fixed contacts 11 and 12 thereof to thus break the circuit through the key ignition switch B to thereby render the motor inoperative. In order to again render the motor operative, the indicator flag D is moved to the horizontal position as indicated in dotted outlines in Fig. 1, to thus close the switch 26 to thereby place the meter C in active recording position to record the mileage and fare. When in this position the ignition system is in the circuit leading from the positive side of the battery F, conductor wire 22, fixed terminal 21, conductor wire 24 to the fixed contact 25 of the indicator switch 26 and from thence through the conductor wire 27 to juncture terminal 28, conductor wire 29, key ignition switch B, conductor wire 30, ignition coil G, conductor wire 31 to the ground 32 and from the opposite ground connection 23 to the negative side of the battery F.

In order to provide means to prevent tampering with the operation of the seat A and switches 10, a plate 34 is secured to the front of the supporting structure 17 of the seat with the upper portion thereof overlying the front of the seat to cover and conceal the space between the same and the supporting structure 17.

What is claimed is:

In a device of the character set forth, the combination with a taxicab having a fare recording meter provided with an indicator flag movable respectively to positions for rendering the meter active and inactive, a motor ignition circuit including a battery, a switch operable by said indicator flag to open the ignition circuit as the flag is moved to a position to render the meter inactive and operable to close the ignition circuit as the flag is moved to a position to render the meter active, and a plurality of switches arranged in series and distributed transversely of the passenger seat and adapted to jointly function to close the ignition circuit independently of the flag actuated switch when the passenger seat is unoccupied and adapted to separately open said ignition circuit independently of said flag actuated switch when the passenger seat is occupied.

THOMAS K. BOOTH.